United States Patent [19]

Ferguson et al.

[11] Patent Number: 5,256,863
[45] Date of Patent: Oct. 26, 1993

[54] IN-STORE UNIVERSAL CONTROL SYSTEM

[75] Inventors: William L. Ferguson, Walnut Creek; Mark H. Wallis, Long Beach, both of Calif.

[73] Assignee: Comark Technologies, Inc., Elk Grove Village, Ill.

[21] Appl. No.: 788,288

[22] Filed: Nov. 5, 1991

[51] Int. Cl.[5] .................... G06K 15/00; G07G 1/12
[52] U.S. Cl. .................................. 235/383; 364/405
[58] Field of Search ............... 235/383; 364/401, 402, 364/404, 405; 395/200

[56] References Cited

U.S. PATENT DOCUMENTS

| | | | |
|---|---|---|---|
| 4,236,604 | 12/1980 | Warner | 186/61 |
| 4,554,446 | 11/1985 | Murphy et al. | 235/385 |
| 4,679,154 | 7/1987 | Blanford | 364/525 |
| 4,723,212 | 2/1988 | Mindrum et al. | 235/385 |
| 4,773,001 | 9/1988 | Blair et al. | 364/200 |
| 4,791,281 | 12/1988 | Johnsen et al. | 235/383 |
| 4,797,540 | 1/1989 | Kimizu | 235/383 |
| 4,877,947 | 10/1989 | Mori | 364/405 |
| 4,882,675 | 11/1989 | Nichtberger | 364/401 |
| 4,908,761 | 3/1990 | Tai | 364/401 |
| 4,910,672 | 3/1990 | Off et al. | 364/405 |
| 4,937,567 | 6/1990 | Orr et al. | 340/825.05 |
| 4,937,742 | 6/1990 | Marshall | 364/401 |
| 4,972,463 | 11/1990 | Danielson et al. | 364/408 |
| 5,008,519 | 4/1991 | Cunningham et al. | 235/383 |
| 5,023,782 | 6/1991 | Lutz et al. | 364/405 |
| 5,053,607 | 10/1991 | Carlson et al. | 235/379 |
| 5,054,092 | 10/1991 | LaCaze | 235/449 |
| 5,109,153 | 4/1992 | Johnsen | 235/468 |
| 5,119,293 | 6/1992 | Hammond | 364/405 |

OTHER PUBLICATIONS

Direct Market Magazine Information Access Co., Take a card... any card please, Feb. 1990, vol. 52: No. 10; p. 63.
The Los Angeles Business Journal, Scissors No More: Vons Plans Scanner for Coupon Process, Jan. 1990, vol. 12; No. 5; Sec. 1; p. 1.
Supermarket News Information Access Co., Winn-Dixie to offer electronic coupons, Jun. 1990, vol. 40; No. 24; p. 10.
Device Specification For "Dot Matrix LCD Unit", Oct. 1986, pp. 1-17.

Primary Examiner—William L. Sikes
Assistant Examiner—Toan Tran
Attorney, Agent, or Firm—Fitch, Even, Tabin & Flannery

[57] ABSTRACT

The present invention relates to a system for automating data acquisition and processing at a checkstand point-of-sale in a retail outlet. Preferred embodiments include a first local area network of POS terminals for initiating merchandise purchase transactions. All of the purchase transactions in the first local area network are passively monitored to acquire primary purchase data. A second local area network of lane terminal devices inputs secondary data, including discount coupon information, check information and bank card information to a universal system controller. The universal system controller mirrors the primary information, processes the primary and the secondary information, and generates output information to the POS terminals of the first local area network via the lane terminal devices of the second local area network, the output information including coupon verification data, coupon amount data, check verification data and bank card verification data.

19 Claims, 9 Drawing Sheets

IN-STORE UNIVERSAL CONTROL SYSTEM

BACKGROUND OF INVENTION

1. Field of the Invention

The present invention relates generally to data acquisition and processing systems for retail merchandisers. More particularly, the present invention relates to systems for fully automating a broad spectrum of front end (i.e., cashier checkstand) point-of-sale (POS) functions in retail merchandise outlets, such as grocery stores.

2. State of the Art

Retail merchandise outlets such as grocery stores possess unique characteristics which are reflected in their business trends. For example, these outlets constitute high volume markets having relatively low profit margins (e.g., net profits typically are in the range of 1% of sales). Accordingly, retail merchandising is a highly competitive market wherein special advertising and other promotional techniques are employed. One of the most popular promotional techniques used by these outlets and their product suppliers (i.e., product manufacturers) is the distribution of product vouchers (e.g., discount or rebate coupons and food stamps). Presently, voucher redemption and collection is handled very inefficiently because current technological advancements have not been effectively used for voucher processing and handling.

Due to their low profit margin, another characteristic of retail outlets is their provision of enhanced customer service to attract additional business. The sentiment to provide enhanced customer service in retail outlets is shared by other industries who recognize the marketing advantage which these high volume outlets afford.

For example, retail outlets (particularly retail grocery outlets) are on the average visited bi-weekly by at least one member from every household. If a third party, such as a lottery ticket distributer can conveniently market their product (e.g., lottery tickets) in a supermarket, the lottery ticket distributer is practically assured of increased sales and profits. Retail outlets can directly benefit by charging an overhead fee to the lottery ticket distributer. The retail outlet also benefits indirectly. A larger customer base is more likely to be established at a retail outlet which can provide errand saving features such as lottery ticket purchasing.

Despite the desire which may exist to enhance the efficiency with which vouchers are currently processed or to provide additional convenient in-store promotional opportunities such as a lottery ticket purchases, the aforementioned characteristics of retail outlets have limited technological advancements in these areas. In addition, other errand saving features such as foreign currency exchange and electronic funds transfer have not been introduced to checkstands of retail outlets.

There are many reasons why the inefficiencies and limited functionally of a retail outlet checkstand have not been enhanced. Of course the aforementioned low profit margins and the desire to expeditiously service a large number of customers has limited the functionality retail owners are willing to provide at retail outlet checkstands. However, a significant concern of retail outlets which severely limits the introduction of enhanced checkstand functionality is their fear that any increased functionality will increase the probability of checkstand downtime. Currently, faults in one point-of-sale (POS) terminal (i.e., cash register) can affect the networked of POS terminals of some or all checkstand lanes. Retail owners can thus not afford to introduce additional checkstand complexities which will enhance the probability of such downtime.

Retail owners are also concerned that enhanced checkstand functionally can not be implemented without increasing the significant checkstand delays which already exist. At best, present lottery ticket vending is performed with large, stand alone devices that are inconveniently located. The nature of the lottery ticket transaction is such that it is very time consuming for the clerk to perform the double function of vending the ticket and key entering the sale of the ticket into the cash register. In addition, on-line lottery games are not vended in the checkstands of major retailers because of their space requirements. The combination of a mark sense reader, ticket printer, and data communications equipment requires a large footprint which most high volume retail stores are unwilling to provide.

Other delays also already exist at checkstands. For example, 15,000 customers typically pass through a single retail supermarket each week. The principal form of payment used by these customers is the personal check and check cashing is, for the most, considered a necessary checkstand function. Check writing coupled with a minimum check verification, results in significant checkstand delays.

Voucher redemption represents another time consuming and costly function typically considered a necessary checkstand function. Due to the aforementioned limitations of retail outlets, food stamp fraud and misuse is a problem which has practically been left untreated by retail outlets. Further, coupon misredemption rates have resulted in significant financial loss to retail outlets and/or product manufacturers.

The limited functionally associated with present checkstands imposes substantial costs on the retail outlets, the product manufactures and thus, the consumers. For example, voucher redemption imposes significant handling costs on the retail outlet and the product manufacturer (e.g., coupon issuer). Presently, voucher redemption begins at a checkstand where entry of coupon or food stamp information is typically performed manually by a cashier. At best, vouchers are handled using a bar code reader to enter a portion of the information encoded on the coupon face (e.g., bar encoded value of a coupon). For example, U.S. Pat. No. 4,554,446, entitled "Supermarket Inventory Control System And Method" describes a conventional coupon scanning system.

Typically, the store clerk (i.e., cashier) totals a customer's bill and then credits coupon and/or food stamp values to the bill. Some stores offer coupon doubling features in a further effort to attract customers and this information is manually keyed in by the cashier.

In some outlets, a coupon verification is required to ensure that coupons are only credited when all coupon conditions (e.g., product purchase, expiration date, and so forth) have been satisfied. However, where the coupon is conditioned on the purchase of a specified product, it is time consuming to check each item to ensure that the customer complied with conditional requirements. Failure to verify that all conditional requirements have been satisfied can result in significant financial loss to the manufacturer. For example, retail outlets can request reimbursement of manufacturers' coupons for products that have never been purchased, billing the manufacturer for the coupon's face value plus a handling charge.

Periodically store personnel accumulate all coupons and/or food stamps received at the checkstand. These coupons and food stamps are then bundled and physically shipped to a third party clearinghouse (i.e., retail outlet) for sorting, counting and processing. The clearinghouse returns the coupons to the product manufacturer and issues debits and credits to the manufacturer and retailer. Because industry estimates reflect an average 7.5 to 8 billion coupons are redeemed each year, significant costs are associated with the shipping and handling of coupons throughout the distribution-redemption and clearing cycle.

Although it would be desirable to eliminate physically returning this large volume of coupons to the manufacturer, characteristics of the retail market make this impractical. For example, manufacturers do not necessarily trust retail outlets integrity in only redeeming valid, properly used coupons. Further, additional information is often encoded on coupons which is only of interest to the manufacturer. This additional information often relates to the particular medium used to distribute the coupon (e.g., newspaper, mass-media, direct mail, on-package coupon) or other demographic information and is used by the manufacturer to assess marketing effectiveness. The low profit margin of retail stores makes it impractical to identify and compile this demographic information for the manufacturer. Thus, the physical return of coupons to the manufacturer is accepted as a cost of doing business.

Competitive retail outlets are almost forced to provide check cashing and voucher redemption functions. However, for reasons mentioned above, little has been done to effectively address the inefficiencies in handling these functions at a checkstand. Rather, the provision of limited checkstand functions has resulted in significant financial losses to both the retailers and the manufacturers.

For example, presently known systems do not address check and food stamp processing in retail outlets. These systems fail to provide efficient verification of check, food stamp or other selected benefit entitlement programs (e.g., WIC government program for women with infants). Known systems fail to verify that the consumer is entitled to use food stamps, that the food stamps actually belong to that consumer and that the proper category of goods are being purchased. Further, only limited efforts have been made to simplify coupon processing by retail outlets and manufacturers. These efforts have, for the most part, merely resulted in high cost systems which are not universally applicable to all retail outlets and which cannot be readily upgraded.

For example, in-store coupon distribution systems employing mechanical devices have been developed using a plastic card (e.g., credit or debit card) with a magnetic strip or universal product code (UPC) to initiate the coupon selection process. With these systems, selected coupons can be physically issued to the customer in-store and redeemed by the customer at the checkstand.

One such automated coupon issuing system is described in U.S. Pat. No. 4,882,675, entitled "Paperless System For Distributing, Redeeming And Clearing Merchandise Coupons". This patent discloses a system for storing coupon information electronically on a special card and is hereby incorporated by reference. Another automated system for dispensing in-store coupons is disclosed in U.S. Pat. No. 4,723,212 entitled "Method And Apparatus For Dispensing Discount Coupons" wherein a record of items purchased is examined and used to trigger generation of a specific product coupon in the store. U.S. Pat. No. 5,008,519, entitled "Foolproof Coupon Redemption System" also describes a manufacturers' coupon redemption system that credits the value of a coupon to a sale, and then physically alters the coupon by mutilation to prevent re-use of the coupon. Despite their limited use of relatively current technological advancements, these systems typically address niche markets which limit the coupon marketing strategies of the manufacturers.

Accordingly, it would be desirable to provide cost-effective, enhanced point-of-sale functionality in retail outlets. The enhanced functionality must be implemented in a manner which will not increase the potential for checkstand downtime. Further, it would be desirable to efficiently implement enhanced checkstand functions which would avoid financial losses typically incurred by retail outlets and manufacturers. In so doing, it would be desirable to enhance the speed with which checkstand functions are currently handled so that customer volume can be increased with improved integrity. Assuming that these seemingly contradictory features (i.e., increased speed versus enhanced transaction integrity without increased downtime) can be resolved, it would be desirable to provide additional functionality at the checkstand in an effort to attract consumers and derive additional revenue (e.g., from lottery ticket distribution).

SUMMARY OF THE INVENTION

In accordance with the present invention, systems and methods are disclosed which permit significant time and cost savings to be realized by consumer product manufacturers, retail outlets and consumers. Using the inventive systems, enhanced checkstand functionality can be provided without increasing the potential for checkstand downtime. Accordingly, checks and voucher fraud can be significantly reduced or eliminated. Retail outlet and manufacturer handling costs associated with the redemption, verification and processing of checks, coupons and/or food stamps can also be reduced or eliminated.

In addition to increasing profits by eliminating traditional costs of doing business, the present invention can directly and dramatically increase a retail outlet's profit margin. For example, retail outlets can offer a much broader range of consumer benefits while increasing customer throughput at the checkstand. These additional services not only will increase profits through direct overhead charges, but will produce indirect benefits by attracting a greater number of customers.

In accordance with the present invention, cost-effective systems are provided which automate all non-cash tender that occurs at a retail outlet point-of-sale (e.g., conventional front end supermarket checkstands) without affecting checkstand downtime. Among other features, the systems provide checkstand functions such as check approval, positive check verification, regional or national voucher (i.e., coupon and electronic benefits transfer) redemption, voucher verification and electronic clearing, direct debit and electronic funds transfer (EFT), automatic frequent shopper benefits, on-line lottery games purchase, foreign currency conversion and other transaction related activities suitable for a checkstand. By combining these services into a single, relatively compact lane terminal device, enhanced functionality at a retail outlet can be cost-effectively provided.

In a preferred embodiment, the present invention relates to a system for automating data acquisition and processing at a retail outlet point-of-sale. The system includes a first local area network of POS terminals for initiating merchandise purchase transactions; means for passively monitoring all of said purchase transactions in said first local area network to acquire primary purchase data; and a second local area network of lane terminal devices for inputting secondary data, said secondary data including discount information (e.g. voucher information) and purchase data (e.g., check information, electronic fund transfer information and so forth). Means are further provided for receiving and processing said primary and said secondary information, said receiving and processing means mirroring said primary information and generating output information to said POS terminals of said first local area network via said lane terminal devices of said second local area network, said output information including discount information (e.g., voucher data) and/or verification data (e.g., voucher verification data, check verification data, bank card verification data and so forth).

BRIEF DESCRIPTION OF THE DRAWINGS

Other objects and advantages of the present invention will become more apparent from the following detailed description of preferred embodiments when read in conjunction with the accompanying drawings, wherein like elements have been designated by like numerals and wherein.

DETAILED DESCRIPTION OF THE PREFERRED EMBODIMENTS

1. System Overview

In a preferred embodiment, the present invention relates to a system for automating data acquisition and processing at a retail outlet point-of-sale. An exemplary system hardware configuration includes several primary components. These primary components are a conventional in-store POS controller for managing a first local area network of POS terminals which initiate merchandise purchase transactions; a first local area network store loop adapter for passively monitoring all purchase transactions in the first local area network; a second local area network of lane terminal devices; and a universal system controller for receiving and processing the passively monitored transactions by mirroring these transactions and generating output information to the POS terminals of the first local area network via the lane terminal devices of the second local area network. These primary components will now be described in greater detail.

2. In-Store POS Controller

Figure 1:
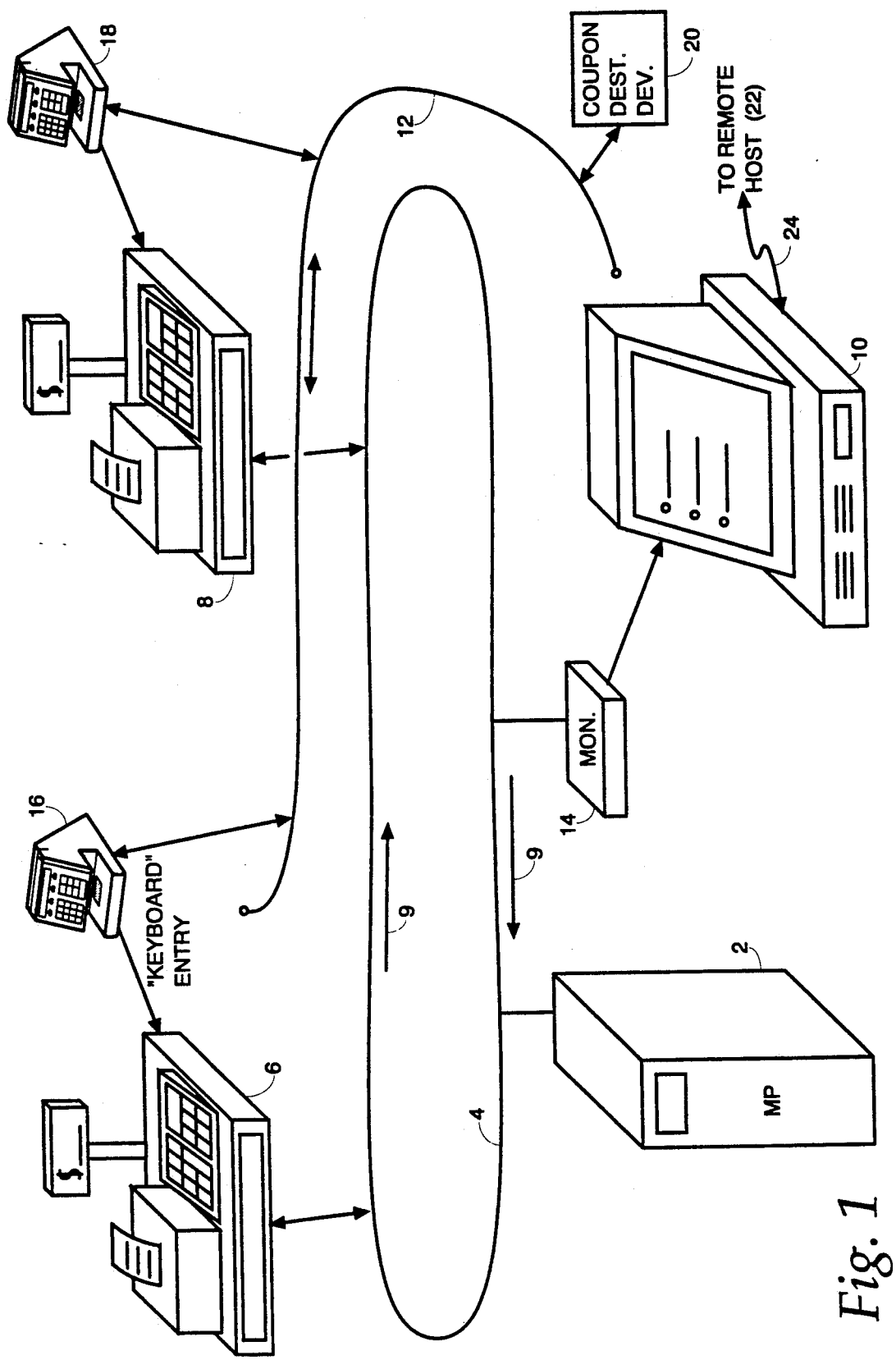
FIG. 1 is an exemplary system diagram.

The in-store POS controller is a conventional system manager for networking the individual POS terminals (i.e., cash registers) of a retail outlet. In an exemplary embodiment as shown in FIG. 1, the POS controller 2 is any known controller, including the known IBM 4683 controller. The POS controller manages a first local area network (LAN) 4 (i.e., a store loop) which interconnects plural POS terminals. Data flow is unidirectional in the POS LAN 4. For example, data flows clockwise in the direction of arrow 9.

In the preferred FIG. 1 embodiment, the network 4 operates using the known Synchronous Data Link Control (SDLC) protocol. For example, U.S. Pat. No. 4,773,001, entitled "Method And Apparatus For Communicating With Remote Units Of A Distributive Data Processing System", describes a POS computer system that utilizes a modification of the known SDLC protocol to communicate among peripheral devices and a central device controller. The modified signaling protocol uses a merged field that combines a beginning flag field and an address. U.S. Pat. No. 4,972,463 entitled "In-store Multiple Device Communications Unit And Centralized Data System Utilizing Same" describes use of a similar SDLC protocol. These patents are hereby incorporated by reference in their entireties.

In a preferred embodiment of the present invention, data from the second local area network of lane terminal devices, is introduced to the POS LAN 4 via the POS terminals. As will be further described below, data is introduced via the POS terminals as keyboard information to avoid downtime of the first LAN 4 should a fault occur in the second LAN.

Generally speaking, any of a variety of three generations of cash registers are presently used as the POS terminals in retail outlet POS networks. This poses a significant problem in attempting to architecturally define a passive POS LAN monitoring and data input system which can be easily integrated into retail outlets employing any one or all of these generations without affecting POS LAN downtime.

More particularly, third generation cash registers are typically personal computer based devices. As such, these devices can readily accept additional inputs through available I/O ports. However, because of the costs associated with upgrading to the more sophisticated third generation devices (e.g., IBM personal computers), many stores continue to operate with first and second generation devices.

First and second generation cash registers are dedicated devices with few, if any, external ports for supporting additional input/output functions. However, in accordance with the present invention, a keyboard wedge technique is used to input information generated by the universal system controller and/or the lane terminal device to a first or second generation cash register. This technique minimizes software integration requirements in adapting the present invention to older POS systems so that data associated with the enhanced functionality of the present invention can be input directly to even these older POS terminals. This technology will be described more fully in connection with the lane terminal device.

In a preferred, exemplary embodiment to be described herein, the FIG. 1 cash registers 6 and 8 are standard IBM 4683 POS terminals which are readily compatible with the IBM 4683 POS controller. These devices are third generation cash registers which include additional, unused I/O ports. However, to render the exemplary system embodiment described herein applicable to all generations of automated cash registers, inputs to the available I/O port of each IBM 4683 POS terminal from each respective lane terminal device are via a keyboard wedge. Again, a keyboard wedge is included in each lane terminal device and will be described more fully with respect to the lane terminal device.

3. Store Loop Adapter

As shown in FIG. 1, a universal system controller 10 receives, via a store loop adapter 14, all information transmitted within the POS network. For items purchased by a consumer and scanned by the cashier, this information includes each product name, whether each item is taxable, whether each item is a food stamp item, the department each item was purchased from, the number of items purchased and a description of each item.

The store loop adapter 14 is thus a physical interface between the first LAN 4 and the universal system controller 10. The store loop adapter is used to convert electrical signals from the IBM data encoding scheme to an industry standard data encoding scheme which can be processed by the universal system controller.

Such adapters can be readily implemented by those skilled in the art. For example, U.S. Pat. No. 4,937,567, entitled "Communication Adapter For Store Loop Communication System", describes a typical interface and adapter for connecting data terminal equipment to a communication bus. The adapter includes a circuit arrangement which transparently monitors the bus traffic and is hereby incorporated by reference. More particularly, FIG. 5 of this patent describes an interface and adapter which can passively monitor an SDLC loop data stream without alteration. Using such a technique, all POS transactions performed by any of the cash registers in FIG. 1 of the present application can be read from the POS LAN 4 and mirrored in the universal system controller 10.

In a preferred embodiment of the present invention, the store loop adapter translates the IBM signal levels and data encoding into an industry standard data communications interface. The store loop adapter also incorporates a phase locked loop to derive a clock from the store loop. This clock is used in qualifying data derived from the store loop. The store loop adapter outputs serial data to a serial communications controller located in the universal system controller using an industry standard format. The format chosen in a preferred embodiment uses an RS-232 electrical interface and a V.24 circuit definition.

Although an exemplary preferred embodiment is described herein using an SDLC protocol and RS-232/V.24 communication interface, it will be appreciated by those skilled in the art that any store loop equipment and network communication protocols can be used. Where alternate equipment, communication and/or data formats are selected, appropriate interfacing between the POS LAN and the universal system controller must be provided.

4. Lane Terminal Devices

The lane terminal devices are the primary I/O devices for the FIG. 1 system. As shown in FIG. 1, a lane terminal device resides in each checkstand lane. In FIG. 1, a lane terminal device 16 is associated with the POS terminal 6 and a lane terminal device 18 is associated with the POS terminal 8. Although two POS terminals and two lane terminal devices are shown in FIG. 1, it will be appreciated that any number of these devices can be included.

A system control LAN 12 permits the lane terminal devices to communicate with the universal system controller 10. The system control LAN 12 can be any known network, including the known Ethernet network.

The lane terminal devices permit store customers and checkers to initiate, review and access a wide variety of front end functions beyond the mere purchase functions input via the POS terminals. Each lane terminal device has a separate display and keyboard on each side for the customer and for the cashier. It also contains other input/output devices necessary to perform the aforementioned variety of in-lane functions. A key attribute of the lane terminal device is that it combines into a single, compact device, a plurality of functions for enhanced convenience of the consumer and the cashiers.

Figure 4:
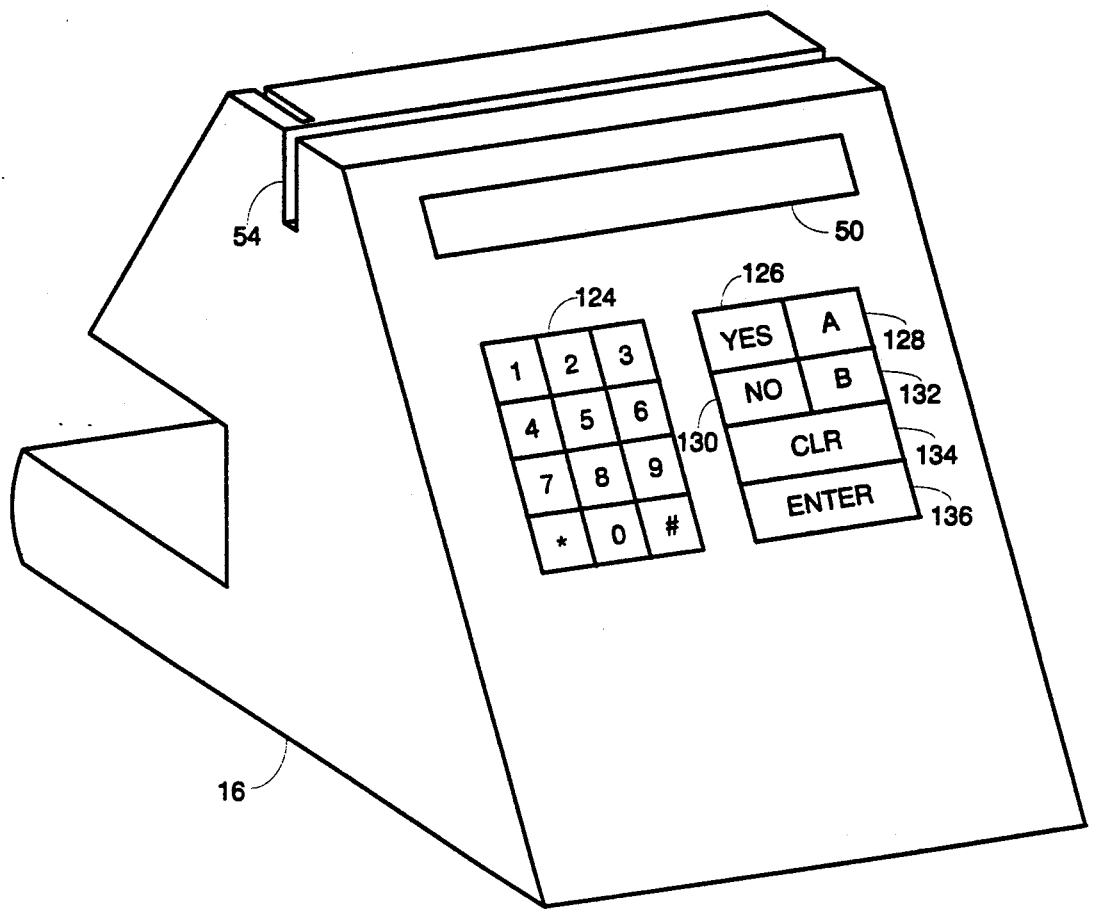
FIG. 4 is a view of an exemplary user-interface for a customer side of a lane terminal device.

The lane terminal device is physically mounted on a platform attached to the checkstand in any location convenient to both customer and cashier. For example, the lane terminal platform can be used to replace the customer's check writing stand in conventional checkstands. Accordingly, the lane terminal device includes a check writing stand 21 (FIG. 4).

In a preferred embodiment, the lane terminal is mechanically designed as a pedestal to maintain as much flexibility as possible. However, every checkstand configuration can be different, even within individual stores. For example, the basic input devices and displays can be incorporated into a platform resting on top of the pedestal. Small circuit boards and individual device controllers can be incorporated into the pedestal and the housing of the lane terminal device. Larger circuit boards can be located in a controller box located underneath the counter and connected via cables.

In an exemplary embodiment, the lane terminal device communicates with the universal system controller via an RS-423 or RS-232 standard interface at 9600 baud. In this exemplary embodiment, communications between the universal system controller and the lane terminal devices are handled using an Ethernet terminal server as will be described with respect to the universal system controller. Each of the lane terminal devices communicates asynchronously with the terminal server at the front of the store. Data is output to the terminal server via a port 55 and a DUART 57. The terminal server multiplexes each terminal's messages and transmits to the universal system controller via a single Ethernet connection. In this manner, each lane terminal will appear to be directly connected to the universal system controller.

In a preferred embodiment, each lane terminal is responsible for performing a self-test and initialization on power up. The universal system controller downloads communications software to the lane terminals after the self test. This communications software includes desired framing, sequence checks and error control for communications with the system controller network 12 and for communicating with a cash register of the in-store POS LAN.

The lane terminal, under command from the universal system controller, displays prompts and accepts inputs (e.g., keyboard, voucher, check, magnetic card, and lottery inputs) from the consumer or cashier for various applications. Any input information is formatted for transfer to the universal system controller via the system controller LAN 12.

Figure 2:
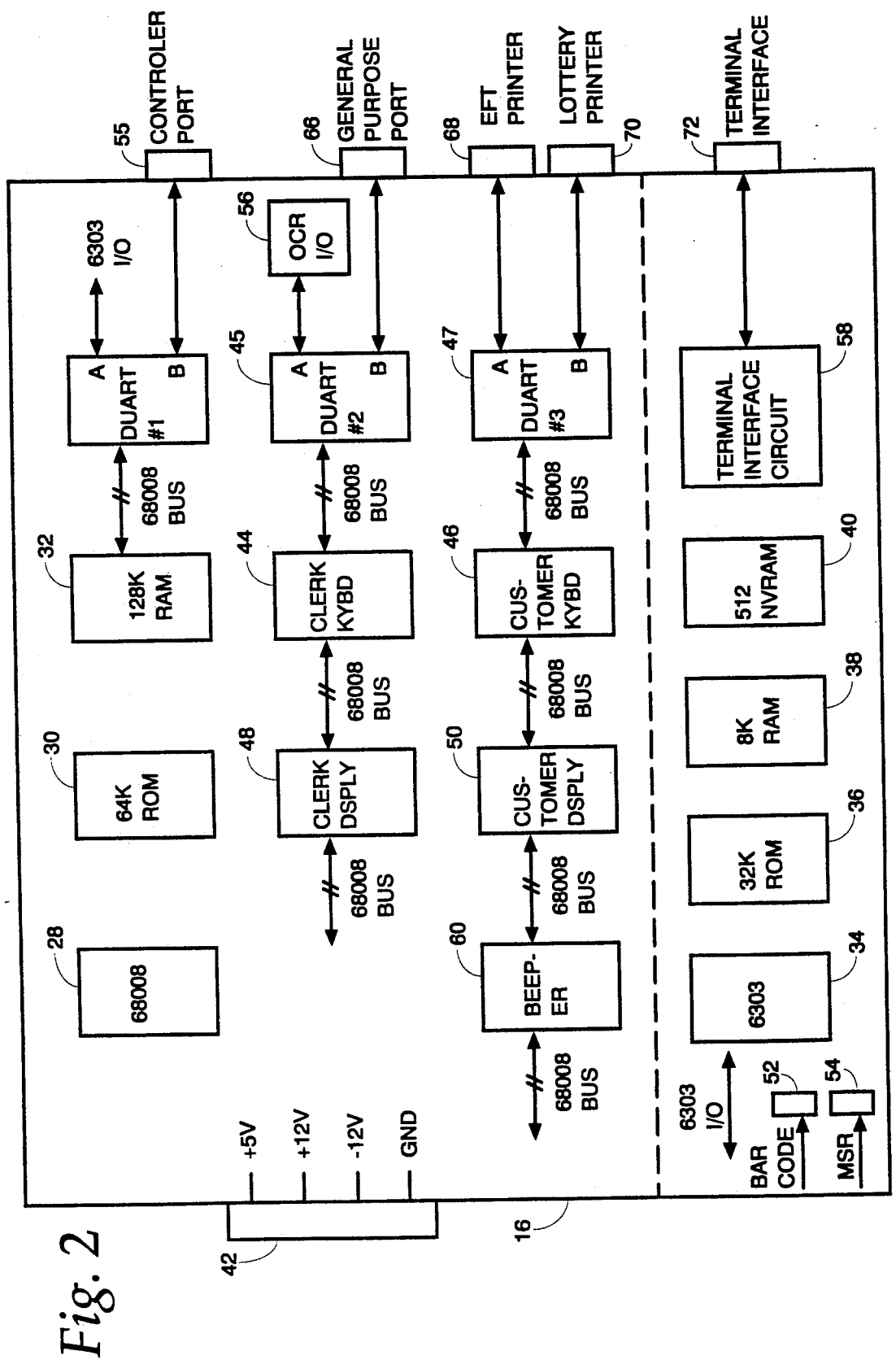
FIG. 2 is a more detailed diagram of an exemplary lane terminal for use in the FIG. 1 system.

As shown more particularly in FIG. 2, a lane terminal device 6 includes a Motorola 68008 microprocessor 28 with an associated 64K ROM 30 and a 128K RAM 32 for downloading communication codes and for frame buffering. The processor 28 can also be used for data flow control to and from various lane terminal devices including the keyboards, displays, beeper and MICR reader.

In a preferred embodiment, a second 6303 processor 34 is provided for controlling bar code decoding, magnetic stripe reading (MSR), and for driving a terminal interface which represents a keyboard wedge. In an alternate embodiment, a single processor can be used to control all features of a lane terminal device. The second microprocessor 34 includes a 32K ROM 36, an 8K RAM 38 and a 512 NVRAM 40. The FIG. 2 lane terminal device is powered from an external power supply 42.

Specific features associated with the FIG. 2 lane terminal device, including the input/output devices, will now be described in greater detail.

a. Keypads

Each lane terminal device includes two 12 key keypads 44 and 46 (i.e., telephone type keypads) and soft function keys. One keypad faces the cashier and one faces the customer. The customer keypads are used for privately entering personal identification numbers (PIN) for electronic debit as well as requests for cash back, debit or check tender. The cashier keypad is used for override information and any additional data which might be needed by the system. In an alternate embodiment, this keypad can be removed from the lane terminal device for ready access by a consumer.

A DUART 45 is associated with the keypad 44 and an associated display 48. Another DUART 47 is associated with the keypad 46 and associated display 50. The DUART's synchronize communications in and out of a lane terminal device.

Figure 3:
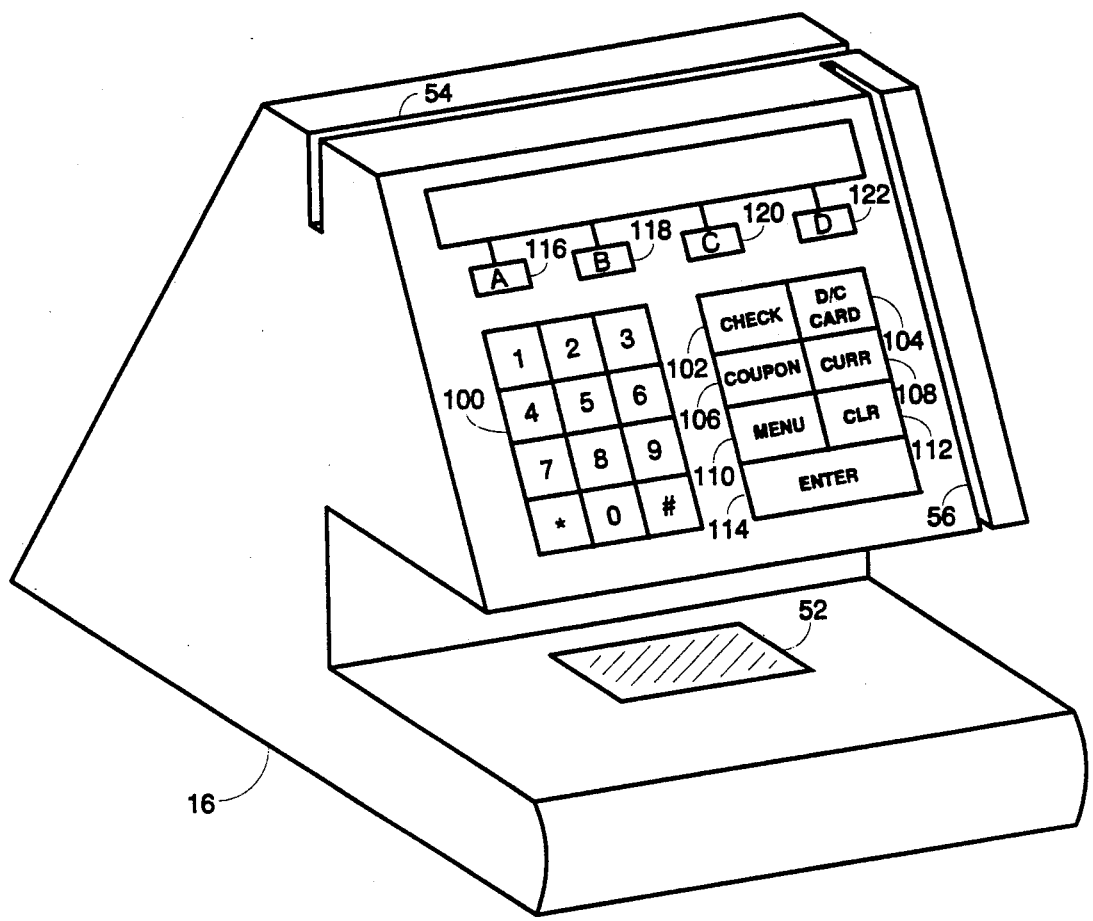
FIG. 3 is a view of an exemplary user-interface for a cashier side of a lane terminal device.

Specifics of a cashier's keypad are shown in FIG. 3. Specifics of a customer keypad are shown in FIG. 4.

Referring to FIG. 3, a clerk's keypad includes a keypad 100. Specific function keys 102, 104, 106 and 108 are used for a check override, a debit/credit override, a coupon override and a currency conversion override. The keys are activated by the cashier when a manual entry of any information relating to these functions is necessary (e.g., a coupon value must be manually keyed in when information is not encoded on the coupon itself). A menu key 110 is used to display a menu of options (e.g., select lottery transactions, currency conversion, EFT and so forth). Clear and enter keys 112, 114 are provided for clearing the display or entering a selected number entry. The keys 116, 118, 120 and 122 are programmable soft font keys used for selecting among up to four options displayed subsequent to activation of any of the aforementioned function keys.

Referring to FIG. 4, a customer keypad is shown which includes a typical telephone type keypad 124 and four function keys 126, 128, 130 and 132. These function keys can, for example, correspond to typical ATM keys. Again, clear and enter keys 134 and 136, respectively, are also provided.

b. Displays

Two backlit LCD displays 48 and 50 are provided. Both displays are a minimum of two lines approximately 2 by 24 and are visible in a normal supermarket check out environment. In a preferred embodiment, the displays are dot matrix LCD units with 40-character/2-line displays available from SHARP Corporation.

The display 48 faces the cashier and the other display 50 faces the customer. Each display is separately addressable by the universal system controller because different messages will be displayed depending on the transaction type. In a preferred embodiment, exemplary messages issued by the universal system controller include:

| To The Customer | To The Checker |
| --- | --- |
| Enter PIN Number | Account Number Unknown |
| Do You Want Cash Back? | Account Verified "99999" |
| Enter Total Amount | Verification Denied "99999" |
| Thank You | |
| Play Lottery | Coupon Value Must Be |
| Manufacturer Coupon For | Manually Keyed |
| Incorrect PIN Number | Coupon Product Not Purchased |
| Product Not Purchased | Non-Food Stamp Item |
| Thank You For Shopping | Currency Conversion Data |
| At | Manufacturer Coupon For | c. Auto-Discriminating Bar Code Reader

An auto-discriminating bar code scanning device 52 is accessible on the cashier side of the lane terminal device for scanning vouchers from any source (e.g., manufacturers coupons). The bar code reader is also capable of scanning any bar encoded media including lottery ticket play slips or tokens in an alternate preferred embodiment. A fixed mounted contact or near contact bar code reader capable of reading standard bar codes and including high density Code 128 is provided in a preferred embodiment.

An exemplary bar code reader suitable for use in a preferred embodiment is the Welch Allyn BCR Card Reader, Specification No. 16205303, available from Welch Allyn, Inc., Skaneatels Falls, N.Y. This bar code reader can read and decode coupons having UPC (number system 5), check digits and 2 and 5 digit supplemental (i.e., suffix) codes. Because the auto-discriminating bar code reader of the lane terminal device can read any bar code, coupon redemption is not limited to targeted coupons generated within the store. Further, coupon reading is not limited to family code and/or value information. Rather, all data encoded on a coupon is received and transferred to a universal system controller database.

More particularly, a coupon typically includes two bar encoded regions. A first bar encoded region of a coupon includes family code (i.e., UPC information) and, in some cases, coupon value information. Where value information is not included on the coupon, the lane terminal bar code reader reads only the family code information. The universal system controller, in response to an absence of value information, generates a message for display at the lane terminal prompting the cashier to manually enter coupon value.

The second region of the coupon is not traditionally read by retail outlets. Rather, this information is read, if at all, by the manufacturer upon return of a coupon. This information identifies regional information regarding the distribution location of the coupon. By reading and accumulating this information in a database of the universal system controller, a more complete profile of coupon usage can be provided to the manufacturer by the universal system controller.

In a preferred embodiment, the universal system controller formats a database with the following information: Manufacturer's Number, Coupon Family Code, Verification Criteria For Proof of Product Purchase, Coupon Value Code, Number of Coupons Bearing Identical Regional/Demographic Information, Suffix Data (i.e., Regional/Demographic Information), UPC Redeemed Against Data; Date and Time Redeemed; Coupon Override Information; Number of Items in the Order; Number of Coupons in the Order; Lane Number; Store Number; Whether Coupon has been Processed by Coupon Destruction Device. By decoding and compiling such information in a coupon database of the universal system controller, information regarding advantageous coupon marketing strategies and validity of coupon use can be provided to the manufacturer with little or no impact to regular operation of the POS controller and in-store POS LAN 4.

Coupon information can be transmitted directly to the coupon clearinghouse and/or manufacturer via a wide area link 24 and central site 22 of FIG. 1. Retail outlets need not participate in the handling and shipping of vouchers. This significantly reduces the time associated with bundling and transferring the coupons to a coupon clearinghouse and eliminates shipping costs. Further, any necessity of the manufacturer to re-read the coupons is eliminated thus significantly saving cost to the manufacturer.

d. Magnetic Stripe Reader

The lane terminal device contains a magnetic stripe reader 54 for manual swipe of credit/debit cards, ATM cards used in EFT approval applications and electronic funds benefit cards issued to authorized recipients of food stamps. A magnetic stripe reader capable of reading and decoding tracks 1 and 2 from financial transaction cards is included with PIN encryption.

In a preferred embodiment, the magnetic stripe reader is a MAGTEK dual track Magnetic Stripe Reader available from Welch Allyn, Inc. of Skaneatels Falls, N.Y. The magnetic stripe reader is located on the top edge of the lane terminal device such that cards can be swiped by either the customer or the cashier.

Because the lane terminal device includes an ability to read credit/debit cards and ATM cards, an encryption device is provided as is well known in the electronic transfer of financial information. This encryption device is, for example, a known DES encryption chip.

e. Check Reader

The lane terminal device contains a unit 56 for reading coded bank and account information from customer checks during check approval. A check reader capable of reading and decoding an entire MICR line is included. The unit is able to read and decode common personal and business checks.

In a preferred embodiment, the check reader is a magnetic Scanteam 8000 check reader available from Welch Allyn, Inc. However, those skilled in the art will recognize that any known check reader having the aforementioned capabilities can be used. The check reader is preferably located in the lane terminal device on the cashier side.

A check MICR line is typically broken into a number of fields. These fields include a first field representing a transit number, or bank number. The transit number is used for routing the check through the Federal Reserve System to the appropriate bank where the check was drawn.

A second field represents an account number, or "on-us" number and a check number. This account number is associated with a particular customer of the bank.

A third field on the check MICR line is an amount field. This field is typically encoded by the bank upon return of the check. However, in a preferred embodiment, the lane terminal device can encode the amount field on the check and charge banks for this service.

f. Debit/EFT Receipt And Lottery Printer

A print mechanism is attached to the lane unit. The printer is used to print a standard "Regulation E" receipt for direct debit and other financial transactions. The printer is cabled to the lane terminal device and is located at any convenient area in the lane. A second printer can be included for lottery ticket printing. In alternate embodiments, a single printer can be used for all printing at a checkstand.

g. Keyboard Wedge

The lane terminal device interfaces with a variety of supermarket checkout cash registers as described above. The imbedded base of current grocery POS systems include IBM, NCR, Datachecker and Fujitsu terminals. As described above, older models of each line do not have external ports available to directly receive generated by the universal system controller and other lane terminal device input/output devices.

Accordingly, in the exemplary embodiment described herein, the universal system controller interfaces to an IBM 4683 or an IBM 3683 POS system via a keyboard wedge 58. The keyboard wedge is capable of entering data such as check tender, total request, check verification number, manufacturer's coupon tender, store coupon tender, miscellaneous tender, and other amounts to the POS system from the universal system controller via the lane terminals.

As shown in FIG. 2, the keyboard wedge is a terminal interface which includes a decoder and a decoder microprocessor. The keyboard wedge can produce decoder outputs which simulate the electric signals generated from a keyboard of the POS terminal (e.g., terminal 6 or 8 in FIG. 1) when a key is depressed. The keyboard decoder can thus receive data signals from the universal system controller (e.g., verified coupon value data) and convert those signals into simulated keyboard signals (i.e., as if the coupon value had been keyed in on the POS terminal). Thus, data which is not entered through the POS terminal keyboard can be electrically entered indirectly through the keyboard wedge without cashier intervention. The POS LAN 4 is therefore not affected by the entry of data from the universal system controller.

Because keyboard wedges are one way devices (i.e., they convert signals into keyboard-like signals which are then transmitted), no protocol is required for the keyboard wedge. A "Y" connector is placed between the POS terminal keyboard and the POS terminal. An output from the keyboard wedge is then connected to the third terminal of the "Y" connection so that POS terminal inputs can be received from either the POS terminal keyboard or the keyboard wedge.

h. Beeper

A single tone beeper 60 is incorporated into the lane terminal device to signal good reads for the checks, vouchers and debit cards. Multiple beeps are issued in order to attract checker attention or to notify the customer of a problem such as mis-redeemed coupon. The beeper emits a single volume 85 DbA tone at 10 centimeters.

i. Lottery Tickets

In a preferred embodiment, lottery tickets are processed at the lane terminal device. A customer selects numbers they wish to play by filling out a mark sense card. This selection is performed at a stand-alone kiosk type device located in the retail outlet. After selecting the desired numbers and number of games to play, the kiosk dispenses a token to the player which contains the requested numbers. This token is, for example, a slip of paper printed with a bar code representing the selected numbers and the number of games.

Alternately, the token is a card containing a magnetic stripe in which the selection is encoded. If a bar code is used, a high density symbology such as code 128 is used to accommodate multiple games and as many as six double digit numbers. When a magnetic stripe is used as the token, play data is encoded in a format that can be read with track 1 of the dual track magnetic strip reader described previously. Track 1 is preferred because of its capability to handle more characters than track 2.

Existing laser scanners used to check out groceries can not read and interpret a dense bar code such as code 128. However, in preferred embodiments of a lane terminal device, the dense bar code can be read and decoded by the aforementioned bar code reader for transfer to the universal system controller. The universal system controller receives and recognizes the lottery ticket information just as it would recognize a UPC code for a standard product. The universal system controller forwards the lottery transaction to the lottery's central computer via the FIG. 1 wide area link 24, issues in-store lottery ticket printer commands and adds the correct charge to the customer's total bill.

j. I/O Ports

All lane terminal device connections are made beneath its base. The lane terminal connecter panel is recessed to accommodate cable connectors and connector hoods while the lane terminal device is mounted on the pedestal. The connector panel spacing accommodates EIA compliant connector assemblies to facilitate ease of cable installation and repair. The connector panel is clearly labeled to facilitate correct cable installation. All external connectors are keyed to assure correct installation.

Referring to FIG. 2, five general outputs from the lane terminal device 16 are shown. The first input/output port 55 is the aforementioned universal system controller port. A general purpose port 66 is presently unused. A EFT port 68 is used for connecting to an EFT printer and a port 70 is used for connecting to a lottery printer. A terminal interface port 72 is used for interfacing outputs from the keyboard wedge 58 into a cash register. These ports will now be described in greater detail.

Universal system controller port 55—This serial connection connects the lane terminal device to the terminal server on the universal system controller. The electrical interface is preferably a standard RS-423. This allows a longer cable length between the universal system controller and the lane terminal device.

Serial Port 1 (EFT Printer port 68)—This is a general purpose serial interface RS-232 for attaching the strip printer for EFT receipts to the lane terminal device.

Serial Port 2 (Lottery Printer port 70)—This is a general purpose serial interface RS-232 for attaching a lottery strip printer to the lane terminal device.

Serial Port 3 (Auxiliary port 66)—This is a general purpose serial interface RS-232 reserved for future system expansion.

Keyboard wedge port—This is a 25 pin port for connection with the cash register which receives inputs from a lane terminal device as electrical signals.

For simplicity and flexibility, all serial ports on the lane terminal are configured identically. The port pinout is patterned after the IBM PC/AT COMI port. The definitions of interface circuits are a subset of CCittV.24. Bit rates of 300 to 19.2Kbit per second are supported.

The following table summarizes the serial communications data and control signals for a communication configuration between a lane terminal device (LTD) and the universal system controller (USC).

| Pin # | MNEMONIC | DIRECTION | DESCRIPTION |
|---|---|---|---|
| 1 | DCD | LTD←USC | Data Carrier Detected |
| 2 | RxD | LTD←USC | Received Data |
| 3 | TxD | LTD→USC | Transmitted Data |
| 4 | DTR | LTD→USC | Data Terminal Ready |
| 5 | GND | N/A | Signal Ground |
| 6 | N/C | N/A | Not Connected |
| 7 | RTS | LTD→USC | Request to Send |
| 8 | CTS | LTD←USC | Clear to Send |
| 9 | N/C | N/A | Not Connected |

The following describes the serial interface signals Received Data (RxD)—Serial data from the USC to the LTD. Transmitted Data (TxD)—Serial data from the LTD to the USC. Data Carrier Detected (DCD)—Indicates to the LTD that the USC is ready to operate and is capable of transferring data. This signal is useful to determine whether the USC is cabled, powered-up, and ready. Data Terminal Ready (DTR)—Indicates to the USC that the LTD is ready to operate. Again, this signal is useful to indicate to the USC that the LTD is cabled, powered-up, and ready. Clear to Send (CTS)—Indicates whether the USC is ready to receive serial data from the LTD. This signal is generally used for flow control. An ON condition on this line indicates readiness. Request to Send (RTS)—Indicates whether the LTD is ready to receive signal data from the USC. This signal is generally used for flow control. An ON condition on this line indicates that the LTD is ready to receive characters. Signal Ground (GND)—This line provides a common signal return for the above signals.

Each serial port in the lane terminal device has its line discipline programmable by the universal system controller. Characteristics such as baud rate and handshakes supported are programmed on a port basis. This allows the lane terminal device to support a wide variety of devices.

5. Universal System Controller

The universal system controller is a central processing and database engine which runs all system applications, generates and updates local databases, and passively monitors all of the transactions which occur over the in-store SDLC LAN 4. Additionally, the universal system controller communicates over local and wide area networks to a relevant central site and all in-store equipment. As shown FIG. 1, the universal system controller also interfaces to a graphics monitor 26. The display allows an operator to run various applications in a windowing environment. It displays system activity monitors, database queries, and so forth.

In a preferred embodiment, a UNIX based workstation is used as the universal system controller. In an exemplary embodiment, the computer is a Mips Magnum 3000 workstation. This computer is a high speed RISC processing platform, which supports large memory capacity, large disk capacity, and a high resolution graphics display. It runs the industry standard UNIX operating system and supports X windows and Motif user interface environments.

The UNIX workstation is preferred for ease and speed of software development. UNIX provides a relatively fast flexible development environment for communications software, applications, and graphic user interfaces. It also provides a most robust and high performing solution for its price range.

As shown in the exemplary FIG. 1 embodiment, the universal system controller 10 is connected to a second bi-directional LAN 12. The system controller LAN 12 is independent of the POS LAN 4. One-way communication with the POS LAN 4 is provided via a serial port of the universal system controller and the SDLC store loop adapter 14.

Information and data which is input via the lane terminal devices is received on the system controller LAN 12 and accessed by the universal system controller 10. This information, in combination with the one way primary information received via the store loop adapter 14, is used to generate the information which is transmitted as one way data into cash registers via the lane terminal devices.

In FIG. 1, lane terminal devices 16 and 18 transfer information, such as messages from the universal system controller 10, to a respective cash register 6 or 8. Information transferred from the universal system controller 10 to one of the cash registers can then be placed by the cash register onto the POS LAN 4 and accessed by the POS controller 2.

Thus, the universal system controller 10, the system controller LAN 12 and the lane terminal devices 16 and 18 do not actively participate in the POS LAN 4. Accordingly, any problems which may develop in the universal system controller 10, the system controller LAN 12, or any of the lane terminal devices will not detrimentally affect the POS controller or the in-store LAN 4. Further, any maintenance which needs to be performed on the universal system controller, the LAN 12 or the lane terminals can be performed independently of the POS controller and the in-store LAN 4. This control feature represents a significant advantage to the retail outlets because it relieves them of any concern that the universal system controller or the lane terminal devices will affect POS operation.

Further, the universal system controller connects to an in-store coupon destruction device 20 and to an out-of-store central site 22 over a wide area link 24. The central site is a system used to monitor, maintain, and update in-store controller databases. For example, it is used to consolidate coupon and frequent shopper data and to update check approval databases. The central site can also be connected with central lottery computers, bank databases for EFT and foreign currency exchange rate databases.

Communication between the central site system and the universal system controller can be performed by modem over existing telephone lines. Such forms of communication are well known. For example, the aforementioned U.S. Pat. No. 4,972,463, entitled "In-store Multiple Device Communications Unit And Centralized Data System Utilizing Same", describes an in-store data communication system that connects various separate devices into one interface for connection to an outside telephone line, and is hereby incorporated by reference.

Figure 5:
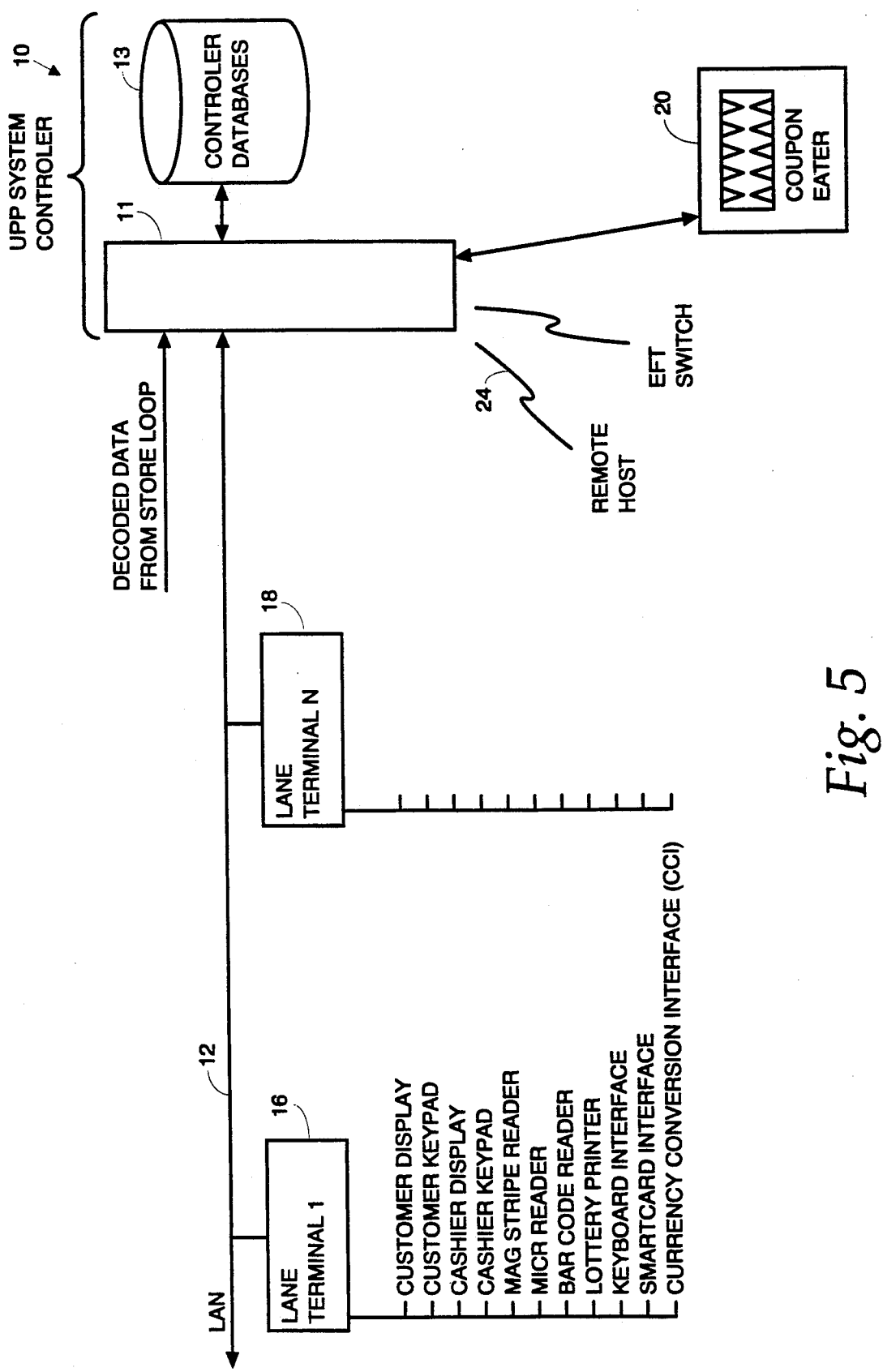
FIG. 5 is a more detailed diagram of a universal system controller and lane terminal network portion of the FIG. 1 system.

As shown more specifically in FIG. 5, the universal system controller 10 includes the processor 11 and databases 13. To accommodate the functionality of the lane terminal devices, databases are provided for coupon family code, check approval, purchase transactions, frequent shopper benefits, coupons tendered, currency exchange rates, lottery ticket records and permissible electronic benefits transfer (i.e., food stamp) users. Any or all of databases can be updated, as described above, via the wide area link 24 of FIG. 1.

In preferred embodiments, the universal system controller applications include monitoring lane activity of the lane terminals, reviewing and updating database information, managing communications over the wide area link, monitoring store loop data over the POS LAN and generating input data to the POS LAN. In addition to monitoring all transactions generated by the in-store POS controller on the POS network, the universal system controller monitors inputs which were generated by any one of the cash registers in response to inputs from the lane terminal devices.

Thus, the universal system controller can ensure that information (e.g., coupon discounts) which are entered by a lane terminal device and verified by the universal system controller are entered into the in-store POS network. The universal system controller can verify that the messages have been entered into the cash register because the cash register will transmit the credits and other keyboard data to the controller. The universal system controller can detect acknowledgement that the credits have been entered into the cash register system even if there is not an explicit protocol between the cash register and the keyboard wedge. More particularly, the universal system controller can monitor acknowledgement messages which are generated by the POS controller. Thus, POS system acknowledgements can be detected when using a keyboard wedge in combination with a POS LAN passive monitoring system (e.g., store loop adapter 14). Where information from any lane terminal device has not been detected on the POS LAN, the universal system controller can, after a predetermined period of time, retransmit the information via the lane terminal device.

Figure 6:
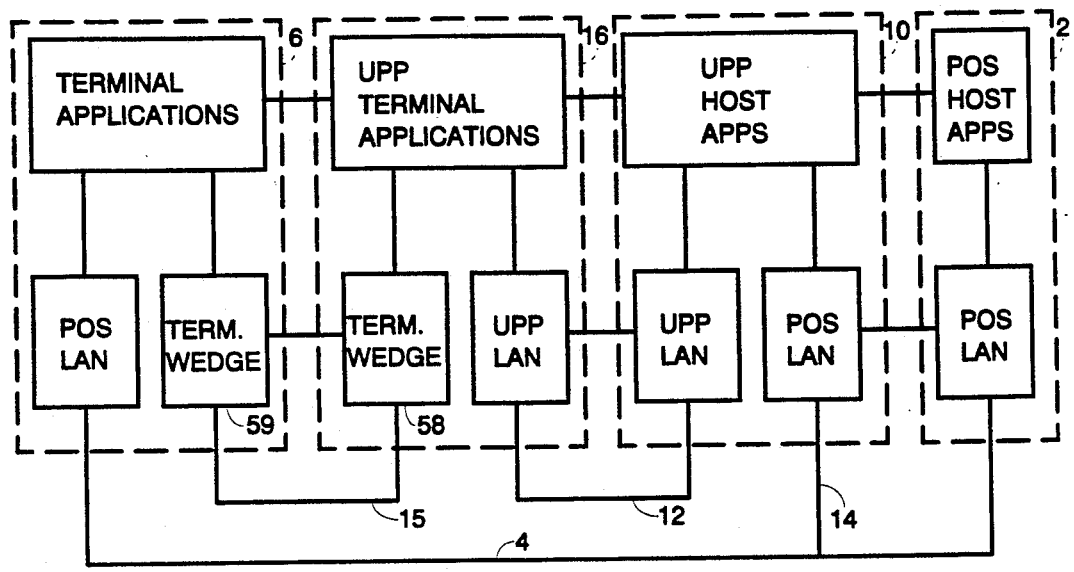
FIG. 6 is an overview of a protocol interface between a POS terminal (i.e., cash register), a lane terminal device, the universal system controller and the POS controller.

FIG. 6 is a high level description of the logical and physical connections of the universal system controller 10 with lane terminal device 16, POS terminal 6, and in-store POS controller 2. As shown in FIG. 6, the universal system controller integrates into the POS controller and LAN by passively monitoring the message traffic between the POS terminals and the POS controller.

The universal system controller applications monitor the purchases and totals accumulated in the cash register via the store loop adapter 14. Each of the lane terminal devices is connected to the universal system controller via the LAN 12. The universal controller interprets the data received from each of the lane terminal devices such as the coupon bar codes, check reader, or magnetic stripe reader. This data is matched with the data accumulated from the POS LAN.

When the processes running within the universal system controller determine that it is necessary to enter data into the cash register such as coupon tenders, EFT tenders, check tenders, total requests and item purchases such as a lottery ticket, the universal system controller creates the required messages. These messages are forwarded to the keyboard wedge 58 located within the lane terminal device. The keyboard wedge is physically connected to the cash register typically via a Y-connection 115 between the cash register's main PC board and the cash register keyboard. As mentioned above, the keyboard wedge simulates the keystrokes that a cashier would normally use to enter tender data.

Figure 7:
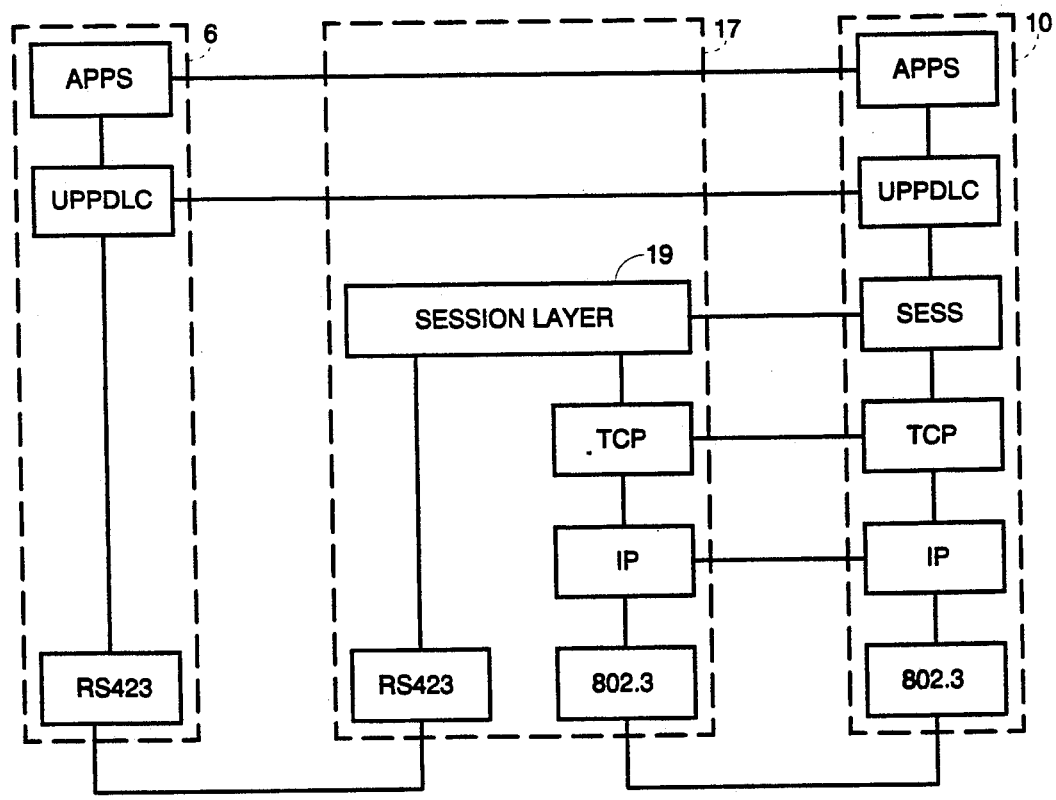
FIG. 7 is an illustration of logical and physical connections between a lane terminal device, and a universal system controller via a terminal server.

FIG. 7, shows high level block description of the protocol for the universal system controller LAN. As mentioned previously, communication between the universal system controller 10 and the lane terminal devices (e.g., lane terminal device 6) is via terminal server 17. In a preferred embodiment, this is a standard peer to peer communications environment utilizing an industry standard Ethernet connection.

6. Coupon Destruction Device

The coupon destruction device 20 (FIGS. 1-2) is a device used in conjunction with the manufacturer's coupon redemption application. The coupon destruction device communicates to the universal system controller via an RS-232 serial connection. The coupon destruction device rescans and reconciles the coupon database, then physically destroys the coupon. Coupon reconciliation is a process which matches coupons collected, verified, and tendered at the checkstand with coupons being destroyed. Coupon destruction renders the coupon useless and is necessary to assure that coupons are not reused for additional credit. The coupon destruction device can, in a preferred embodiment, be performed in a back room using a device networked to the coupon database of the universal system controller.

The coupon destruction device is a freestanding or desktop unit. It contains a controller, bar code scanner, mechanical gate, and a destruction device (e.g., a modified paper shredder). In a preferred embodiment, coupons are collected and fed to the coupon destruction device. An operator deposits coupons individually in a chute where they are scanned and destroyed. A database of all destroyed coupons is also maintained by the universal system controller for transmission to the manufacturer.

7. System Operation a. Overview

Figure 8:
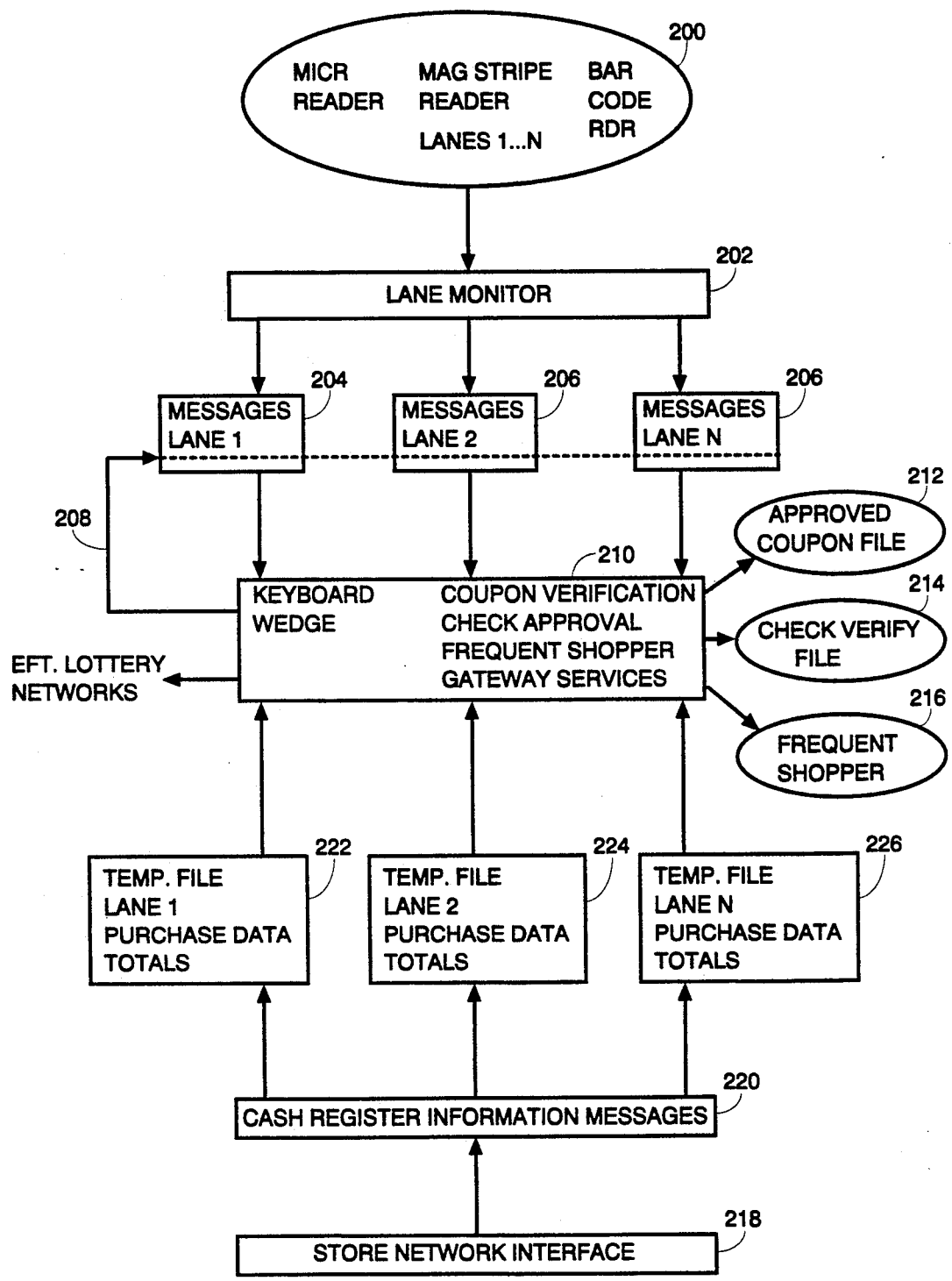
FIG. 8 is a general data flow diagram for a universal system controller and its associated system controller network.

FIG. 8 shows a general data flow diagram for the universal system controller of FIG. 1. As shown in FIG. 8, general data input by the functional elements 200 of a lane terminal device (e.g., MICR reader, magnetic strip reader, and so forth) are input via a lane monitor 202 to a universal system controller 210. The lane terminal devices generate messages 204, 206, 208 which are input to the universal system controller via the LAN 12.

Upon receiving information from the lane terminal devices, the universal system controller performs operations such as coupon verification, check approval, frequent shopper and wide area link (i.e., gateway) services. Outputs are generated by the universal system controller to the lane terminal devices via the communication path 208. The universal system controller accesses and maintains databases (i.e., files) including purchase files, voucher and voucher verification files, check verification files, frequent shopper files, lottery files, currency conversion files and so forth. Further, the universal system controller communicates via wide area network links with external EFT and lottery networks.

The universal system controller 210 is also shown to receive cash register information messages 220 via store network interfaces 218. These messages include all item scan messages, start and end transaction messages, totals, tender functions, and so forth. All items purchased within a customer transaction are maintained in lane files 222, 224 and 226 of the universal system controller. Information from the lane files is used for coupon validation and frequent shopper programs. The information from these files, including purchase data totals, is received by the universal system controller via the store loop adaptor as described previously.

b. System Applications

The system automates a variety of existing supermarket checkstand processes. Additionally, it provides a vehicle for new capabilities and enhancing existing capabilities. Exemplary applications include check approval, EFT, voucher redemption, frequent shopper programs, currency conversion, and lottery ticket sales.

(1) Check Approval

Figure 9:
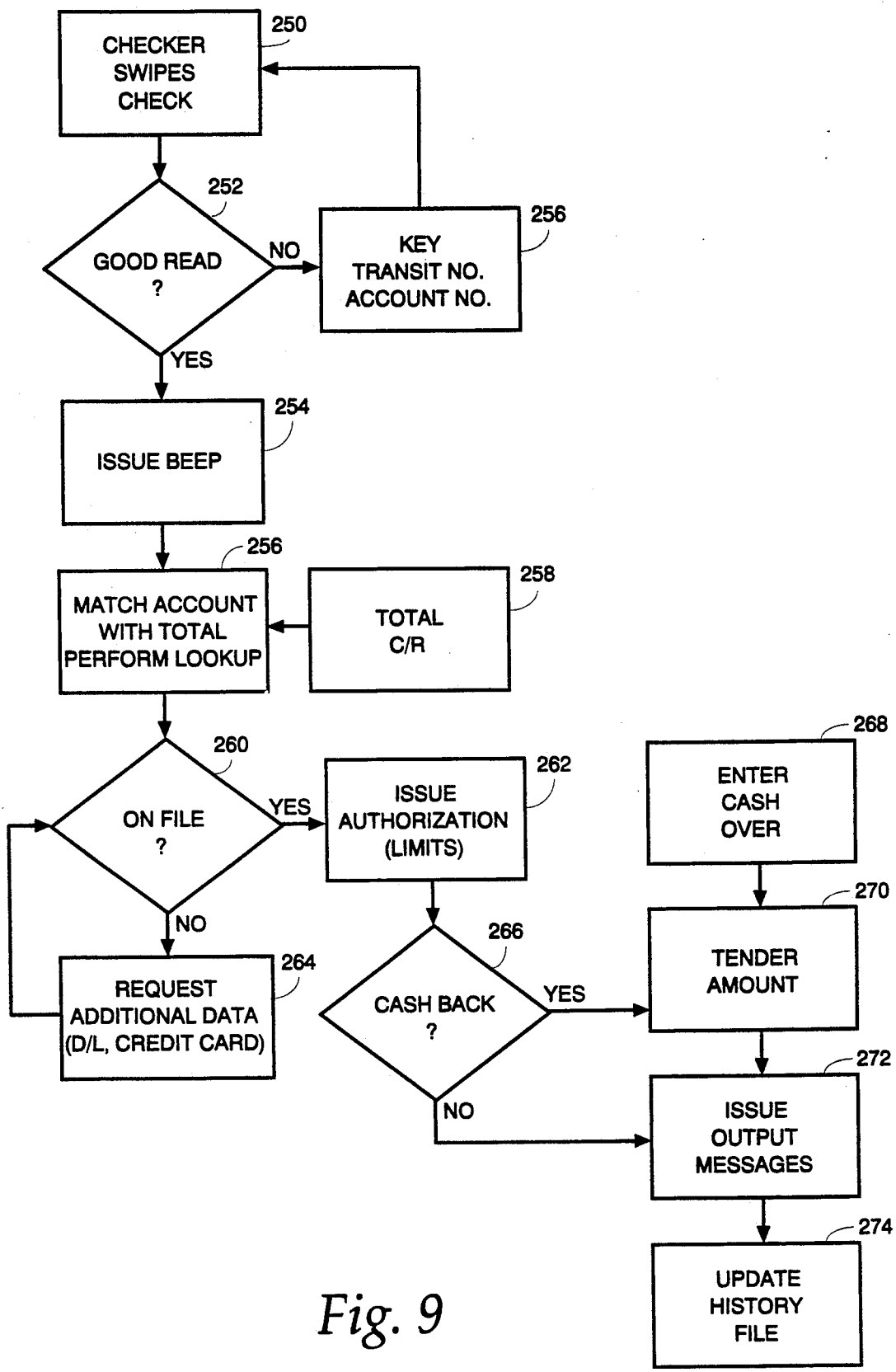
FIG. 9 is an exemplary flow chart for a check approval process.

One of the major functions of the system is to verify checks by capturing MICR data and matching it to a local database of known customers. FIG. 9 shows a general flow diagram for a check approval process. The tender procedure is started when a check is passed, or swiped, through a check reader on a cashier side of a lane terminal device as indicated at block 250. The check reader will optically or magnetically read the MICR code on the check and record the account number, bank number and check number.

If the read was good, the beeper included in the lane terminal device issues a beep as indicated in blocks 252 and 254. If the read was partial or incomplete, a prompt to the cashier to request and manually enter transit number and account number is displayed as indicated in block 256. This information is manually entered by activation of the check override key and the keypad.

Where the read was good and a beep issued, the customer account number is matched with a cash register total by the universal system controller in a database (block 256). The transaction total is obtained from the last cash register total message read by the universal system controller for that lane via the store loop adapter (block 258). If no total has been encountered, the universal system controller will generate a request for the total and wait until it reads the transaction total from the POS LAN 4.

In a preferred embodiment, the transit number (bank number) and the account number are used to access an in-store authorization file as shown in block 260. Alternate embodiments can establish a direct access to the customer's bank or to external databases to initiate sufficient funds verification and/or electronic funds transfer in a manner similar to that used for credit/debit and ATM cards.

In the preferred FIG. 1 embodiment, the account number is first used to identify a unique customer number. This customer number is then used to determine an in-store authorization record from the authorization file as shown in block 262. Where a record on the customer is not identified, a display is provided to the cashier to request additional data for establishing a record as indicated in block 264.

The account number is not used alone because some customers have several checking accounts. Using a unique customer ID provides a link to multiple checking accounts. Some standard form of identification, such as drivers license number, or multiple credit cards or a customer service card can be used to establish the unique customer record. The authorization record, or file, thus contains information such as checking account numbers, account status, limits, cumulative amount, check history, and so forth.

Once the check has been validated, a record is written to the check file containing the bank code, account number, and check number. Additional information, such as the store, lane number, and transaction number are included. The record may also include other statistical items such as the number of items in the order. In preferred embodiments where a passive frequent shopper function is employed, the check authorization record is made available to update a frequent shopper file for that customer. Where a certain purchase amount has been exceeded in a predetermined period of time (e.g., 90 days), additional in-store benefits can be issued to the customer immediately after totalling the customer's bill (e.g., offer 10% discount on total purchase).

The check amount and approval information is entered into the POS LAN through the keyboard wedge as a pair of messages. The first message generates any authorization requests required by the POS controller. The second message is the actual check tender function and amount tendered. If the check fails the verification procedure, a lane terminal message will be generated and displayed to the cashier. In this case, the amount of the check is not transferred by the lane terminal device to the POS terminal.

Where the customer has written a check greater than the total, a cash back decision block 266 prompts the cashier to activate a cash over function as indicated in block 268. The cashier then tenders the amount via block 270 to be returned to the customer.

Where the customer has written a check for the exact amount of the total, the display on the cashier side of the lane terminal device indicates that the proper amount has been tendered as indicated in block 272 and the check value is passed to the POS terminal. After the transaction has been completed, the check authorization record and possibly a frequent shopper database of the universal system controller are updated as discussed above and as indicated by block 274. In a preferred embodiment, upon receiving a purchase total from the cash register via the store loop adapter 14 and approving a check, the universal system controller then activates a MICR printer at the lane terminal to encode the amount of the purchase on the check.

Alternately, all validated checks received at the cash registers can be transferred to a back room in the store where one or more MICR printers are provided. For example, at the end of a business day, all checks received during the course of that day can be physically transferred to this back room and encoded. For this purpose, the universal system controller creates a database of all checks received. Using the account number and check number, information is read from the check during processing of the check at the checkstand lane, and correlated to the total purchase associated with that check. The universal system controller can then use this database to oversee proper encoding of each check.

The check reader represents an efficient, fast way of collecting information about a check. The electronic input of this information not only saves the checker the time of manually inputting the information, but can also be used to add revenue to a retail outlet via the check encoding feature.

(2) Debit Card Transactions

The magnetic stripe reader and encryption device of the lane terminal device are used in a manner similar to that of known ATM machines. More particularly, in paying for a purchase using a credit/debit card or ATM card, a lane terminal device message prompts the user to enter a PIN via the consumer keyboard of the lane terminal. This PIN is transmitted to the universal system controller along with the necessary data from the financial card. Upon receipt of the message from the lane terminal, a request is generated for the purchase total if one has not already been taken. This total is displayed along with a message querying for cash back. When the funds transfer has been approved, the universal system controller generates the proper tender messages for transmission to the cash register. Access is provided to an appropriate financial institution via the universal system controller 10, the wide area link 24 and the out-of-store central site 22 of the FIG. 1 system.

After entering an amount of a purchase via the consumer keyboard, a transaction verification is returned from the financial institution indicating that sufficient funds exist for the purchase. The verification information is displayed to both the consumer and the cashier. Electronic funds transfer can then be used to credit an in-store account by inputting relevant information regarding the transaction into the cash register for transfer to the POS controller 2. A frequent shopper database of the universal system controller can also be updated.

System software at the lane terminal decodes the magnetic stripe and wraps a protocol around the data for transfer within the universal system controller network. Normally, a magnetic stripe includes two tracks referred to as track 1 and track 2. Track 2 includes the account number, the PIN offset, and the expiration date. Track 1 contains the track 2 information and in addition contains information such as the account number and the customer name.

In a preferred embodiment, the magnetic stripe reader can read either or both of tracks 1 and 2. Since the magnetic stripe reader included in the lane terminal is a dual track reader, the lane terminal device determines which track to take the data from; when both tracks are acceptable, track 1 data is the default.

Each debit card transaction also generates a printed receipt from the EFT printer. For example, the system outputs the date and time, location and total for printing.

(3) voucher Redemption And Verification

Coupons are scanned through the auto-discriminating bar code reader integrated into each of the lane terminal devices. As mentioned above, the bar code reader reads coupon codes and any suffix codes as indicated in block 300 of FIG. 10. As in the case of a check read, if a good read is detected for the coupon, the system parses coupon data by examining the coupon code information as indicated in blocks 302 and 304. Where a good read was not obtained, the system prompts the cashier via the display to enter coupon information via the keyboard as indicated in block 306.

It is assumed that coupons are normally redeemed at the end of order after all items in the transaction have been scanned. All UPC coupon codes can be distinguished because they are number systems "5".

The coupon codes consist of the one digit number system, a five digit manufacturer code, a three digit family code and a two digit value code, plus a check digit. The suffix code can be either a two digit or five digit addendum and contains information specific to the manufacturer and is captured by the lane terminal. In preferred embodiments, this suffix information is decoded and assembled in a universal system controller database.

The lane terminal reads and decodes the coupon bar codes. The bar code data is bundled together with appropriate protocol statements and transmitted to the universal system controller via the system controller network 12. In the preferred embodiment as described above, all coupons are physically bundled and transferred to a back room for subsequent processing (e.g., coupon destruction). A back room processor is tied in to the system controller network 12 and receives all coupon information previously stored in the universal system controller database.

In an alternate embodiment, the back room processor can also parse the bar code data into its component parts as mentioned above. The component parts are then assembled in a database for subsequent transmission to a coupon clearing-house via the wide area link and out-of-store central site.

Figure 10:
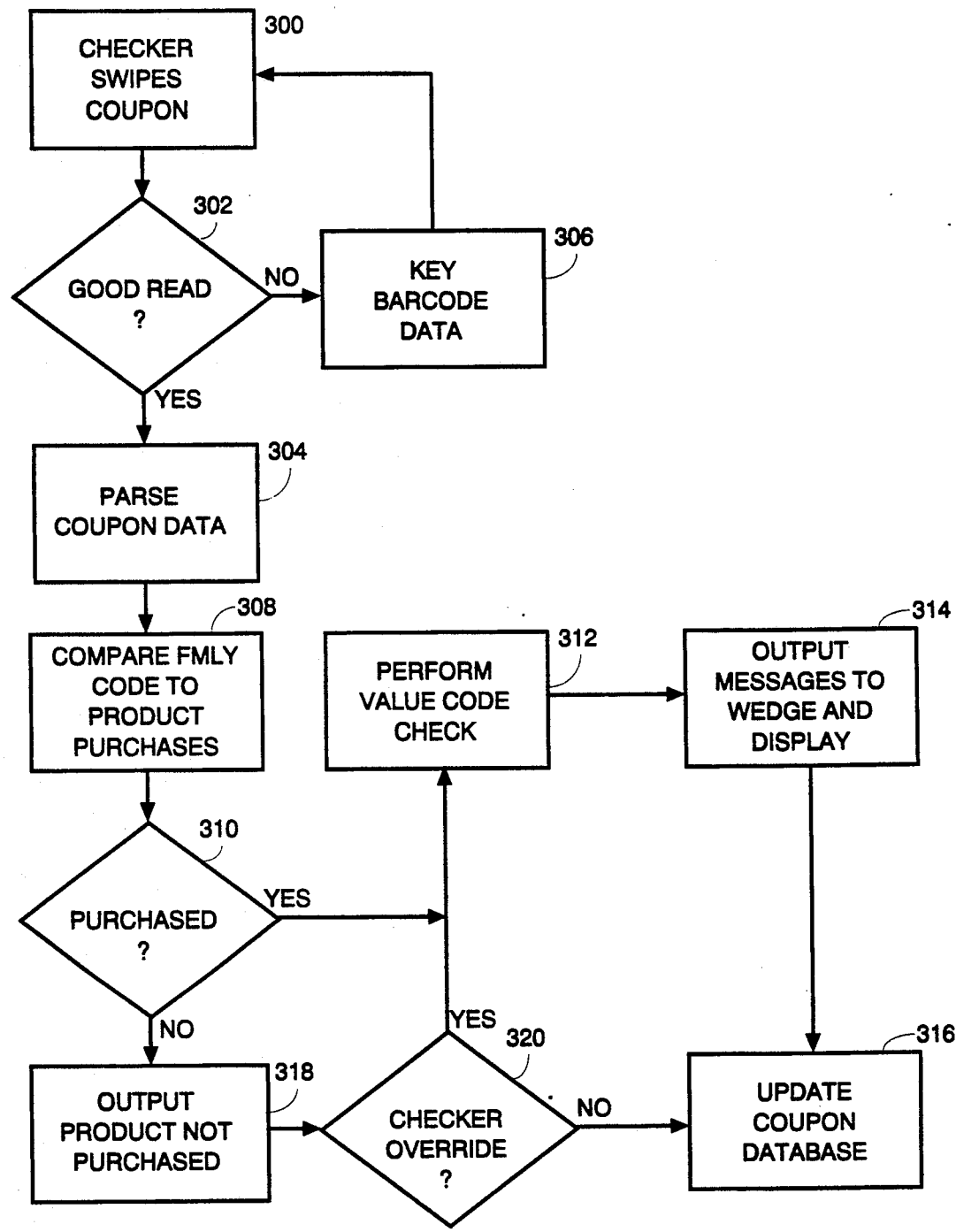
FIG. 10 is an exemplary flow chart of a coupon validation process.

For those manufacturers requiring proof of purchase (determined by the manufacturer's number on the coupon), the coupon family code is validated by comparing the manufacturer's preloaded family code tables against the item codes purchased during the transaction. This validation information is included in the universal system controller database for transfer to the manufacturer.

Where the family code has been determined to correspond to products actually purchased, as indicated by blocks 308 and 310 in FIG. 10, a value code check is performed as indicated in block 312. Assuming the value code check is affirmative, messages are indicated to credit the consumer's bill via the keyboard wedge and messages are displayed to the cashier as indicated in block 314. Further, the aforementioned coupon databases of the universal system controller are updated to indicate that the coupon has been cleared as indicated in block 316.

Where a product associated with the coupon has not been purchased as indicated in block 318, the coupon database is updated to indicate that a coupon misredemption was improperly attempted. This information can also be added to a customer history database. However, as indicated by block 320, the checker can override an indication that a product was not purchased such that a value code check is performed as indicated in block 312. The use of the override feature is then also recorded in the coupon database.

In accordance with the present invention, if an appropriate item has been purchased, then a message is created by the universal system controller and sent to the keyboard wedge to issue a credit for the proper amount via an in-store cash register. The amount of the credit is determined based on a table look-up which translates from the coupon bar code data to an actual dollar amount. This total will include any in-store bonuses identified for particular products in an in-store coupon database of the universal system controller. If a coupon has been tendered, but the appropriate product has not been purchased, a message is sent to the lane terminal indicting that the product was not purchased. For manufacturers not requiring proof of purchase, coupon credits are issued as defined in the UPC coupon field.

The validation function described above should be considered a complete validation. In alternate embodiments, validation strategies include checking for manufacturer number only, accepting all coupons automatically or performing proof of purchase at one digit or two digit level. For example, if a manufacturer has properly assigned their family codes, proof of purchase performed at the three digit level is the most restrictive in terms of the specific products which satisfy the election criteria. Proof of purchase performed at the one digit level is a super group of all the three and two digit groups. Hence proof of purchase at the one digit level is the least restrictive and many more products will be acceptable at this level.

The coupon database consists of the store, manufacturer number, family code, suffix code, redemption item, date, time, lane number, transaction number, and additional data as required for statistical analysis. This additional data may include the count of the number of items included in the order and the total number of coupons tendered. Encryption of the coupon data is required in a production environment. This database is accessed by the coupon destruction device to match coupons destroyed with actual coupons redeemed. Afterwards, the coupon destruction device updates the coupon database with information regarding any coupons which have been destroyed.

Electronic Benefits Transfer (EBT) can be performed in a manner similar to that described above with regard to coupon redemption and verification. More particularly, when food stamps are presented to a cashier for redemption, a magnetic stripe card is swiped through the magnetic card reader. A database showing a history for the consumer can then be accessed. Further, food stamp information can be entered and compared against the shopping list of items purchased by the consumer and scanned at the cash register. Where products on the shopping list do not correspond to food stamp items, a message can be produced at the lane terminal indicating this to the cashier.

The database of customers using food stamps can be maintained along with a record of the number of misredemption attempts made by each customer. A record of all food stamps used can also be retained in a database of the universal system controller. This database can then be transferred via the wide area link to an out-of-store central site for subsequent transfer to the appropriate issuing authority (e.g., retail bank).

(4) Frequent Shopper

At the conclusion of check out, all items are summarized by UPC and written to the disk. The check authorization record can be used as the frequent shopper identifier. If a frequent shopper program is already in place, the existing identification mechanism can be used. This data will be stored until the file is transferred to a remote processor for storage and analysis. All purchases of particular items and/or total purchases can be retained in the frequent shopper database.

(5) Currency Conversion

To initiate a currency conversion, a cashier selects this option on the cashier side of the lane terminal device. A menu of, for example, four different currency conversions appears at which time the user selects one via the A-D selection keys on the lane terminal device. Via the database associated with the universal system controller, a message can be displayed to correlate the total bill with the equivalent currency conversion selected. At that time, the customer can pay in the foreign currency previously selected.

(6) Lottery Ticket Purchase

Regardless of the token methodology employed, the consumer carries the aforementioned lottery token to the cash register and gives it to the checker just as they would any other product sold in the store. The checker swipes the token over or through the appropriate input device such as the magnetic stripe reader or the bar code scanner at the lane terminal device. The checker returns the token to the customer, who may keep it and reuse it for a future game or discard the token. The lane terminal will decode the token and transmit messages via the LAN 12 to the universal system controller. The universal system controller interprets the message as a lottery ticket purchase and then wraps the transaction in an appropriate protocol and transmits the message to the lottery ticket central site via the wide area link.

After the lottery verifies the customer's selection and returns security codes and printer instructions via the wide area network, the universal system controller relays these messages to a lottery printer attached to one of the serial ports contained in the lane terminal device from which the transaction originated. When the ticket has been successfully printed, (as determined by checking for appropriate condition codes generated by the printer), the universal system controller issues a set of commands to the keyboard wedge which will automatically enter the lottery ticket charge to the cash register. This charge appears on the customers receipt and is added to the grocery purchase. Since the essential processing for the system is independent of the cash register systems, it will be possible for a consumer to have their purchases checked out without incurring check out line delays.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A system for automating data acquisition and processing at a checkstand point of sale (POS) in a retail outlet comprising:
    a first local area network of POS terminals for initiating merchandise purchase transactions;
    means for passively monitoring all of said purchase transactions in said first local area network to acquire primary purchase data;
    a second local area network of lane terminal devices for inputting secondary data, said secondary data including purchase discount information and/or payment verification information;
    means for receiving and processing said primary and said secondary information, said receiving and processing means mirroring said primary information and generating output information to said POS terminals of said first local area network via said lane terminal devices of said second local area network, said output information including discount information and/or verification data.

2. A system according to claim 1, wherein said receiving and processing means further includes:
    means for calculating retail outlet value add-on to manufacture coupons.

3. A system according to claim 1, wherein said lane terminal further includes:
    a keyboard wedge for transferring output data from said receiving and processing means to said first local area network.

4. A system according to claim 1, wherein said lane terminal device further includes:
    a check reader for capturing check information.

5. A system according to claim 1, wherein said lane terminal device further includes:
    a bar code scanner for inputting bar encoded information.

6. A system according to claim 1, wherein said lane terminal device further includes:
    a magnetic stripe reader for inputting bank card information;
    a data encryption device for encoding predetermined financial information; and
    means for electronically transferring funds in response to said encrypted bank card information.

7. A system according to claim 1, wherein said lane terminal device further includes:
    means for electronically crediting electronic benefits transfer information.

8. A system according to claim 1, wherein said lane terminal device further includes:
    a smart card reader.

9. A system according to claim 1, wherein said lane terminal device further includes:
    a lottery ticket purchase device and a lottery redemption, recordation and verification capability.

10. A systems according to claim 1, wherein said means for receiving and processing further includes:
    a check verification database for identifying and verifying check accounts.

11. A system according to claim 10, wherein said check verification data base further includes:
    a record of all check accounts having a history of insufficient funds for one or more retail outlets.

12. A system according to claim 1, wherein said lane terminal device further includes:
    a customer data entry keypad and display.

13. A system according to claim 1, wherein said lane terminal device further includes:
    a cashier data entry keypad and display.

14. A system according to claim further including;
    means for physically processing redeemed coupons to inhibit their subsequent use, said coupon processing means being connected to said second local area network for verifying whether all coupons used to generate a rebate have been physically defaced.

15. A system according to claim 14, wherein said coupon processing means is located separately from said point-of-sale checkstand.

16. A system according to claim 1, wherein said receiving and processing means further includes:
    a database of coupon use and verification information for transmission to a coupon clearinghouse.

17. A system according to claim 1, wherein said data receiving and processing means further includes:

means for storing frequent shopper information for distributing predetermined benefits to subsequently identified frequent shoppers.

18. A system according to claim 17, wherein said frequent shopper information is determined by recording the number of checks the customer writes to a designated retail outlet or outlets.

19. A system according to claim 1, wherein said receiving and processing means further includes:

a currency conversion database for correlating total purchase amounts to at least one additional currency.

* * * * *

UNITED STATES PATENT AND TRADEMARK OFFICE
CERTIFICATE OF CORRECTION

PATENT NO. : 5,256,863
DATED : October 26, 1993
INVENTOR(S) : William L. Ferguson It is certified that error appears in the above-indentified patent and that said Letters Patent is hereby corrected as shown below:

Column 14, line 17, change "COMI" to --COM1--.

Column 14, line 52, change "signal" to --serial--.

Column 20, line 59, change "voucher" to --Voucher--.

Signed and Sealed this

Thirty-first Day of May, 1994

Attest:

BRUCE LEHMAN

Attesting Officer     Commissioner of Patents and Trademarks